(12) United States Patent
Ferris et al.

(10) Patent No.: US 8,909,783 B2
(45) Date of Patent: Dec. 9, 2014

(54) MANAGING MULTI-LEVEL SERVICE LEVEL AGREEMENTS IN CLOUD-BASED NETWORK

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 560 days.

(21) Appl. No.: 12/789,660

(22) Filed: May 28, 2010

(65) Prior Publication Data
US 2011/0296019 A1    Dec. 1, 2011

(51) Int. Cl.
*G06F 15/173*    (2006.01)

(52) U.S. Cl.
USPC .............................. 709/226; 726/23; 726/24

(58) Field of Classification Search
USPC ............. 709/224, 226, 223; 705/7.27, 10, 80; 718/1; 717/177; 726/23, 24
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 8,069,242 B2 * | 11/2011 | Hadar et al. | 709/224 |
| 8,234,400 B2 * | 7/2012 | Bansal et al. | 709/233 |
| 8,510,835 B1 * | 8/2013 | Bucu et al. | 726/23 |
| 2001/0039497 A1 | 11/2001 | Hubbard | |
| 2002/0069276 A1 | 6/2002 | Hino et al. | |
| 2002/0099669 A1 * | 7/2002 | Lauer | 705/80 |
| 2002/0165819 A1 | 11/2002 | McKnight et al. | |
| 2003/0037258 A1 | 2/2003 | Koren | |
| 2003/0110252 A1 | 6/2003 | Yang-Huffman | |
| 2003/0135609 A1 | 7/2003 | Carlson et al. | |
| 2004/0162902 A1 | 8/2004 | Davis | |
| 2004/0210591 A1 | 10/2004 | Hirschfeld et al. | |
| 2004/0210627 A1 | 10/2004 | Kroening | |
| 2004/0268347 A1 | 12/2004 | Knauerhase et al. | |
| 2005/0131898 A1 | 6/2005 | Fatula | |
| 2005/0144060 A1 | 6/2005 | Chen et al. | |
| 2005/0182727 A1 | 8/2005 | Robert et al. | |
| 2005/0289540 A1 | 12/2005 | Nguyen et al. | |
| 2006/0075042 A1 | 4/2006 | Wang et al. | |
| 2006/0085530 A1 | 4/2006 | Garrett | |

(Continued)

OTHER PUBLICATIONS

Ferris, et al., "Systems and Methods for Cominatorial Optimization of Multiple Resources Across a Set of Cloud-Based Networks", U.S. Appl. No. 12/953,718, filed Nov. 24, 2010.

(Continued)

*Primary Examiner* — Dustin Nguyen
(74) *Attorney, Agent, or Firm* — Lowenstein Sandler LLP

(57) ABSTRACT

Embodiments relate to systems and methods for managing multi-level service level agreements (SLAs) in cloud-based networks. A resource managing module can manage resources in the cloud-based networks in response to the detection of one or more triggering events. In embodiments, the triggering events can be changeovers in time periods, or meeting or exceeding thresholds associated with end user operation of the resources in the cloud-based networks. The multi-level SLAs can specify how to adjust the resources in the cloud-based networks in response to the detection of the triggering events. The resource managing module can adjust applicable resources in the cloud-based networks as specified by the multi-level SLAs.

20 Claims, 5 Drawing Sheets

(56) References Cited

U.S. PATENT DOCUMENTS

| | | |
|---|---|---|
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226716 A1 | 9/2007 | Kimura et al |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1* | 11/2009 | Nickolov et al. ............ 717/177 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0088150 A1* | 4/2010 | Mazhar et al. ............... 705/10 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1* | 1/2011 | Jackson ..................... 709/226 |
| 2011/0131335 A1 | 6/2011 | Spaltro et al. |
| 2011/0138050 A1* | 6/2011 | Dawson et al. ............. 709/226 |
| 2011/0179415 A1* | 7/2011 | Donnellan et al. ............... 718/1 |
| 2011/0213712 A1* | 9/2011 | Hadar et al. .................. 705/80 |
| 2011/0238458 A1* | 9/2011 | Purcell et al. ............. 705/7.27 |

OTHER PUBLICATIONS

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

(56) References Cited

OTHER PUBLICATIONS

DeHaan, "Methods and Systems for Securely Terminating Processes in a Cloud Computing Environment", U.S. Appl. No. 12/550,157, filed Aug. 28, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
Ferris et al., "Methods and Systems for Metering Software Infrastructure in a Cloud Computing Environment", U.S. Appl. No. 12/551,514, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environments", U.S. Appl. No. 12/627,764, filed Nov. 30, 2009.
Ferns et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12,714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System Installation in Cloud-Based Network", U.S. Appl. No. 13/149,877, filed May 31, 2011.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

* cited by examiner

US 8,909,783 B2

MANAGING MULTI-LEVEL SERVICE LEVEL AGREEMENTS IN CLOUD-BASED NETWORK

FIELD

The present teachings relate to systems and methods for managing multi-level service level agreements (SLAs) in cloud-based networks, and more particularly to platforms and techniques for managing and adjusting resources in the cloud-based networks in response to the detection of one or more triggering events.

BACKGROUND OF RELATED ART

A service level agreement (SLA) is an agreement between a user and a cloud network provider. The user, for example, a company, is associated with a plurality of end users of a cloud-based network provided by the cloud network provider. The SLA specifies that the cloud network provider agrees to commit an amount of resources associated with virtual machines in the cloud network for use by the end users during operation of software products and applications. In return, the user can be charged a specified rate in proportion to the amount of committed resources. For example, in the SLA, the cloud network provider can commit to provide or maintain a specific amount of server uptime, persistent storage, software application instantiation, network performance, cloud storage, support response time, and other elements. Further, the SLA can detail any remedies or adjustments for any service failure associated with the use of the resources in the cloud network. Vendors to the user, such as independent software vendors (ISVs), can allow their software products and applications to be executed and operated by the end users via the virtual machines in the cloud network.

The SLA, however, does not account for peak or low usage times, an increase in the number of end users operating the virtual machines, and other situations that can cause the usage of the resources in the cloud network to fluctuate. For example, there can be times or situations in which the user can be forced to pay for on-demand service if the resource usage exceeds what is specified in the agreement. Further, there can be times or situations for which a segment of the resources in the cloud network can remain unused by end users.

Therefore, it may be desirable to provide systems and methods for managing multi-level SLAs in cloud-based networks. In particular, it may be desirable to agree upon a resource commitment that can vary based on various factors or triggering events.

DESCRIPTION OF EMBODIMENTS

Figure 1:
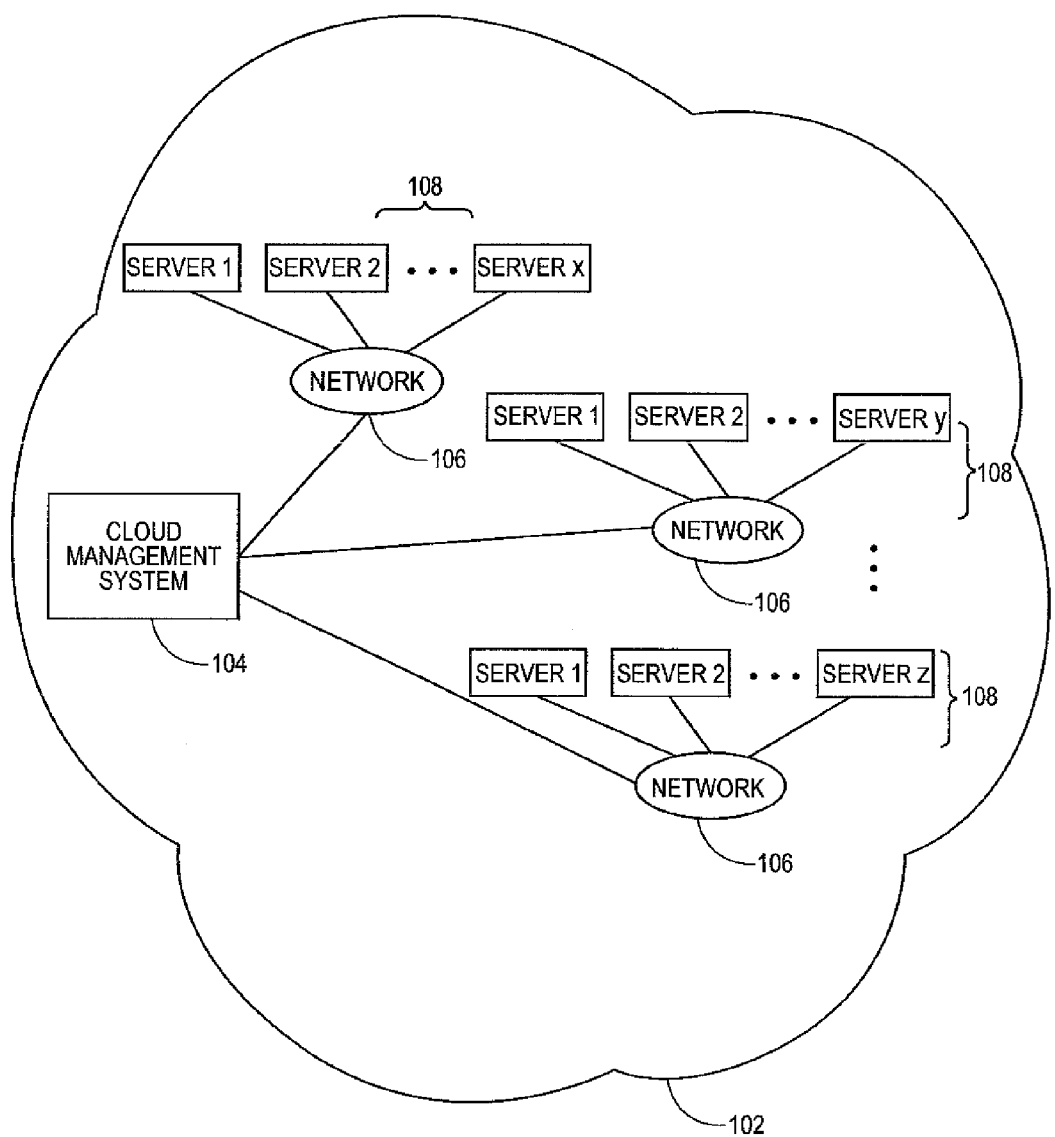
FIG. 1 illustrates an overall cloud system architecture in which various embodiments of the present teachings can be practiced.

Embodiments of the present teachings relate to systems and methods for managing multi-level SLAs in cloud-based networks. In particular, embodiments relate to platforms and techniques for managing and adjusting resources in the cloud-based networks available for end user operation in response to detecting one or more triggering events. In embodiments, the end user operation can be a set of users accessing, via a set of instantiated virtual machines, application or product resources provided by one or more vendors, such as ISVs.

Embodiments described herein can be implemented in or supported by a cloud network architecture that can support multi-level SLAs. As used herein, a "user" can refer a person, customer, subscriber, administrator, corporation, organization, or other entity contracting into a multi-level SLA with a cloud network provider. In embodiments, the user can be a vendor itself, such as an ISV. Further, as used herein, a "cloud" can comprise a collection of resources that can be invoked to instantiate a virtual machine, process, or other resource for a limited or defined duration. Further, as used herein, a multi-level SLA can be an agreement between a user and a cloud network provider. For example, the user can be a company or other entity with an online storefront that can utilize software applications of a vendor that are supported by resources of the cloud network provider. In particular, the multi-level SLA can specify various levels of resources, such as virtual machines, to be provided to the user by the cloud network provider. The end users associated with the user can utilize the provided resources to operate products and applications of the vendor. In embodiments, the cloud network provider can charge the user various rates based on the levels of resources allocated for end user operation, among other factors. For example, the cloud network provider can charge the end user more for a high level of resources. As used herein, the resources can be hardware such as, for example, servers, device drivers, storage such as hard drives, databases, random access memory (RAM) and other memory, processors, multimedia cards, and the like; software, bundled with, installed on, or otherwise associated with the hardware; and/or other resources. In embodiments, vendors such as ISVs can supply software resources for use with other resources. Resources can also include communications resources, such as ports or channels provided to a virtual machine or other machine or process in the cloud. Resources can likewise include services, such as Web-based services deployed in the cloud, for example security or identity management services and/or other resources.

In embodiments, a resource managing module can be independent of any user or vendor to the user, and independent of any one cloud network. In embodiments, the resource managing module can be implemented on a cloud management system and can be configured to monitor resource usage and manage resource availability in one or more cloud networks. For example, the resource managing module can be configured to monitor end user operation of the applications and products via one or more instantiated virtual machines. Further, the resource managing module can be configured to detect one or more triggering events, and adjust resources associated with a set of virtual machines in one or more cloud networks in response to the one or more triggering events and based on specifications of a multi-level SLA. In embodiments, the one or more triggering events can be a changeover of specified time periods, or can be a usage condition threshold, such as conditions relating to an increase or decrease in end user use of the resources, being reached or exceeded. It should be appreciated that other triggering events are envisioned.

Instead of situations where a user may be forced to pay, on an on-demand basis, for resources that exceed the resources specified in a conventional SLA, or situations where the user may be charged an amount for resources that is disproportionate to the amount actually used by the end users, the multi-level SLA can allow for both predicted or unexpected changes in end user operation within the cloud networks while also being cost-efficient. Further, the multi-level SLA can decrease the chance of cloud providers not being able to support the necessary end user operation. Therefore, users can save money throughout the life of the multi-level SLA. Further, the management of the multi-level SLAs can make for a more streamlined process.

As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines is managed by a cloud management system 104. The cloud management system 104 can comprise a dedicated or centralized server and/or other software, hardware, and network tools that communicate via network 106 such as the Internet or other public or private network with all sets of resource servers to manage the cloud 102 and its operation. To instantiate a new set of virtual machines, a user can transmit an instantiation request to the cloud management system 104 for the particular type of virtual machine that the user desires to invoke for its intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user desires to be available to each instance of the virtual machine or other resource. In embodiments, the requesting user can for instance specify a service level agreement (SLA) acceptable for their purposes. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more of the set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 may respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 may respond to a request for instantiation at a programmed time with an offer to deliver the specified quantity of processor cycles within a specific amount of time, such as the next 12 hours.

The cloud management system 104 can select groups of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in the set of resource servers 108. The cloud management system 104 can receive a confirmation message back from each participating server in the set of resource servers 108 indicating a status regarding the provisioning of their respective resources. Various sets of resource servers may confirm, for example, the availability of a dedicated amount of processor cycles, amounts of electronic memory, communications bandwidth, or applications or other software prepared to be served.

Figure 2:
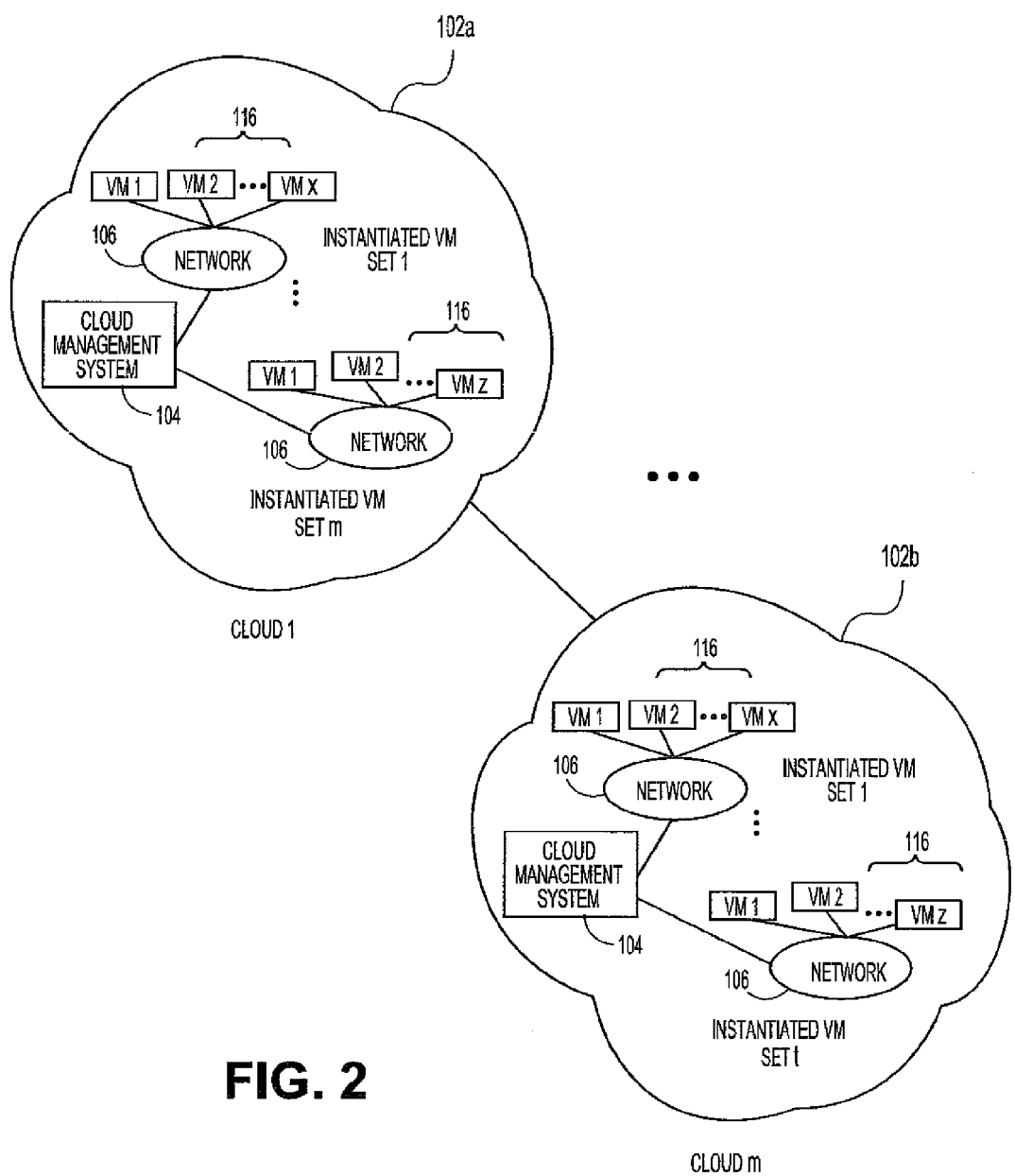
FIG. 2 illustrates an overall cloud system architecture including multiple cloud arrangements in which various embodiments of the present teachings can be practiced in another regard, according to various embodiments.

As shown for example in FIG. 2, the cloud management system 104 can then instantiate one or more than one set of virtual machines 116, or other processes based on the resources supplied by the registered set of resource servers 108 (shown in FIG. 1). In embodiments, the cloud management system 104 can instantiate a given number, for example, 10, 500, 1000, or other numbers of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track, and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the network 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102a, 102b or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102a, 102b. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated machines 116, processes, or other resources can be scaled up or down immediately or within a short period of time on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or almost constant, since instances are assembled from abstracted resources that can be selected and maintained from diverse sources based on uniform specifications.

In terms of network management of the set of virtual machines 116 that have been successfully configured and instantiated, the cloud management system 104 can perform various network management tasks including security, maintenance, and metering for billing or subscription purposes. The cloud management system 104 of a given cloud 102a, 102b can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping, or successive times. The cloud management system 104 can, in such implementations, build, launch, and manage multiple sets of virtual machines based on the same or different underlying set of resource servers 108, with populations of different instantiated virtual machines 116 such as may be requested by different users. The cloud management system 104 can institute and enforce security protocols in a cloud 102a, 102b hosting multiple sets of virtual machines. Each of the individual sets of virtual machines can be hosted in a respective partition or sub-cloud of the resources of the main cloud 102a, 102b. The cloud management system 104 of a cloud can for example deploy services specific to isolated or defined sub-clouds, or isolate individual workloads/processes within the cloud to a specific sub-cloud. The subdivision of the cloud 102a, 102b into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102a can also interact with a set of instantiated virtual machines or processes generated in a second, third or further cloud 102b. Further, the cloud management system 104 of the first cloud 102a can interface with the cloud management system 104 of the second cloud 102b, to coordinate those domains and operate the clouds and/or virtual machines or processes on a combined basis. The cloud management system 104 of a given cloud 102a, 102b can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
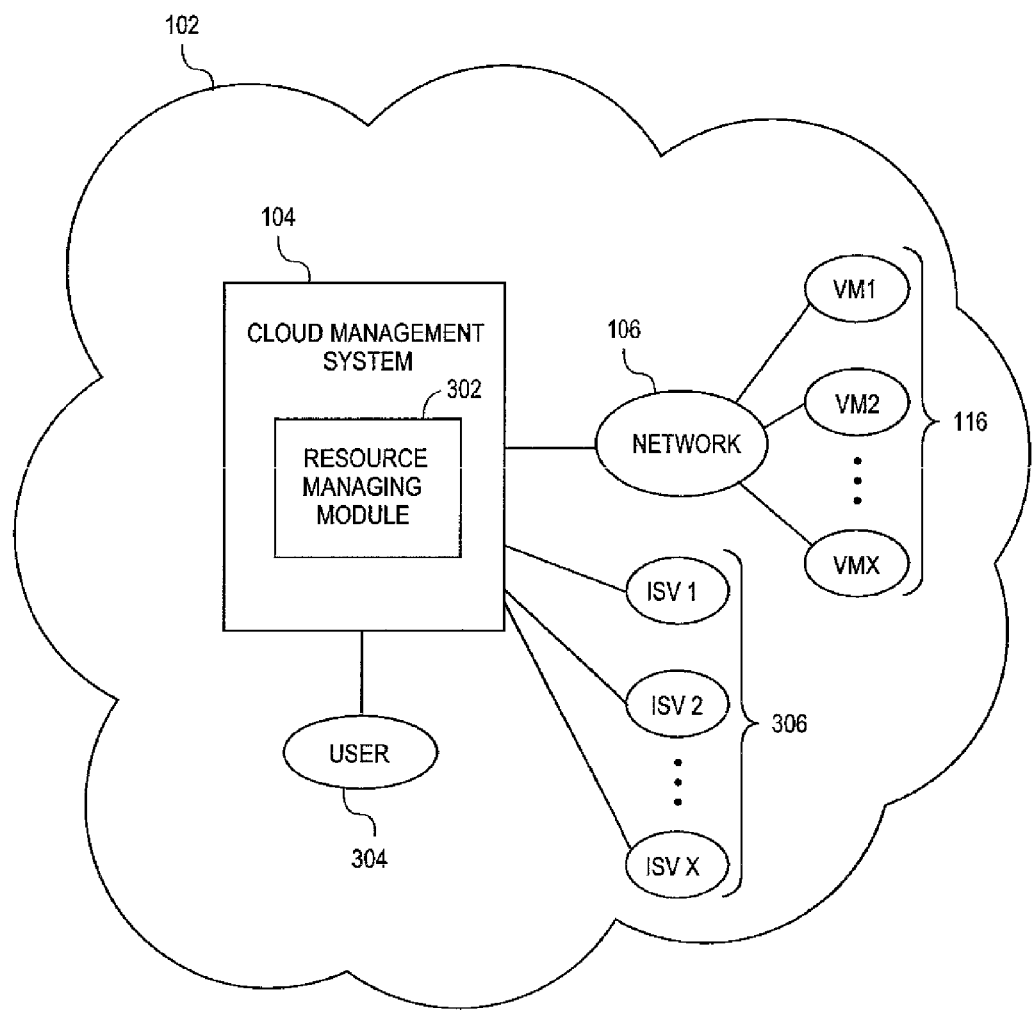
FIG. 3 illustrates an exemplary network configuration that can be used in systems and methods for managing multi-level service level agreements in cloud-based networks, according to various embodiments.

FIG. 3 illustrates an exemplary network configuration that can be used in systems and methods for managing a multi-level SLA in cloud-based networks. In embodiments as shown, the cloud management system 104 can comprise a resource managing module 302 configured to interface with the set of instantiated virtual machines 116 via the network 106 to detect one or more triggering events, and adjust resources associated with the set of instantiated virtual machines 116 based on the one or more triggering events and in accordance with a multi-level SLA between a cloud network provider and a user 304. It should be appreciated that the resource managing module 302 can be implemented on other hardware and/or software components configured to interface with the other components and entities described herein. Further, it should be appreciated that the resource managing module 302 can be configured to interface with additional clouds (not shown in figures) and associated resources, such as virtual machines, of the additional clouds.

In embodiments, the user 304 can be an owner, administrator, company, or other entity who can provide, provision, or otherwise deliver software applications, or other software, hardware, or other products or services, such as products and services of one or more ISVs 306, to end users accessing the cloud 102. In embodiments, the end users can access the set of instantiated virtual machines 116 located in the cloud 102. It should be appreciated that the user 304 can have one or more multi-level SLAs with one or more cloud providers to provide software product(s) and/or maintain end users in one or multiple clouds, and/or across multiple products and/or product lines. The resource managing module 302 can adjust resources associated with the set of instantiated virtual machines 116 in accordance with specifications of any applicable multi-level SLAs. In embodiments, the multi-level SLAs can specify resource availability related to the use of one or more of the set of instantiated virtual machines 116 by end users to operate software applications, products, services, and the like provided by, for example, the one or more ISVs 306. The resource managing module 302 can be configured to communicate with the user, 304, the one or more ISVs 306, the set of instantiated virtual machines 116, and/or other machines, hosts, nodes, or resources. In embodiments, the resource managing module 302 can track and manage the set of instantiated virtual machines or other resources instantiated in the cloud 102, as well as the set of instantiated virtual machines or other resources instantiated in other clouds.

In embodiments, the multi-level SLA can be a multi-tiered SasS subscription plan for users, such as an entity utilizing products of an ISV, according to embodiments of the present teachings. For example, the user 304 can enter into a multi-level SLA with a cloud network provider whereby the cloud network provider can commit, in a first commitment level, to provide 1,000 virtual machines for use by end users to operate software products associated with an ISV during peak weekday business hours (e.g. Monday-Friday, 9:00 AM-5:00 PM), provide, in a second commitment level, 500 virtual machines for use by end users during off-peak weekday hours (e.g. Monday-Friday, 5:00 PM-9:00 AM), and provide, in a third commitment level, 200 virtual machines for use by end users during weekend hours (e.g. all day Saturday and Sunday), wherein the cloud network provider can bill the user monthly for a period of 12 months. This exemplary multi-level SLA can have one or more triggering events, such as the changeover points from peak weekday business hours to off-peak weekday hours to weekend hours. Accordingly, in this example, the amount of available virtual machines can be reduced in response to detecting when the time is 5:00 PM on a weekday. It should be appreciated that other multi-level SLAs with varying terms and specifications are envisioned.

The resource managing module 302 can be configured to examine a multi-level SLA between a cloud provider and the user 304 to determine a plurality of commitment levels for the set of instantiated virtual machines 116 based on detected triggering events. For example, the resource managing module 302 can detect the changeover to an off-peak time period, such as when the time changes to 5:00 PM, and correspondingly reduce the resources associated with the set of instantiated virtual machines 116 from a first commitment level to a second commitment level, as specified by the multi-level SLA. Similarly, the resource managing module 302 can detect the changeover to a peak time period, such as when the time changes to 9:00 AM, and correspondingly increase the resources associated with the set of instantiated virtual machines 116 from the second commitment level to a third commitment level, as specified by the multi-level SLA. In embodiments, the triggering events can be the reaching or exceeding of usage condition thresholds related to the end user operation of the set of instantiated virtual machines 116. For example, the resource managing module 302 can increase resources associated with the set of instantiated virtual machines 116 from a first commitment level to a second commitment level if end user operation reaches or exceeds a threshold level. Similarly, the resource managing module 302 can decrease resources associated the set of instantiated virtual machines 116 from the second commitment level to a third commitment level if end user operation reaches or falls below a low-threshold level.

In embodiments, the resource managing module 302 can terminate or instantiate one or more virtual machines in the same cloud 102 or in multiple clouds 102. Further, the resource managing module 302 can terminate a set of instantiated virtual machines 116 in one cloud 102 and instantiate another set of virtual machines 116 in another cloud 102 to effectively "roll over" resources available to end users from one cloud-based network to another. In embodiments, the resource managing module 302 can be configured to provide an output report detailing any resource adjustment to the user 304 or other entity. For example, the output report can be provided to the user 304 at fixed or varied intervals, or at any point during the terms of the multi-level SLA.

Figure 4:
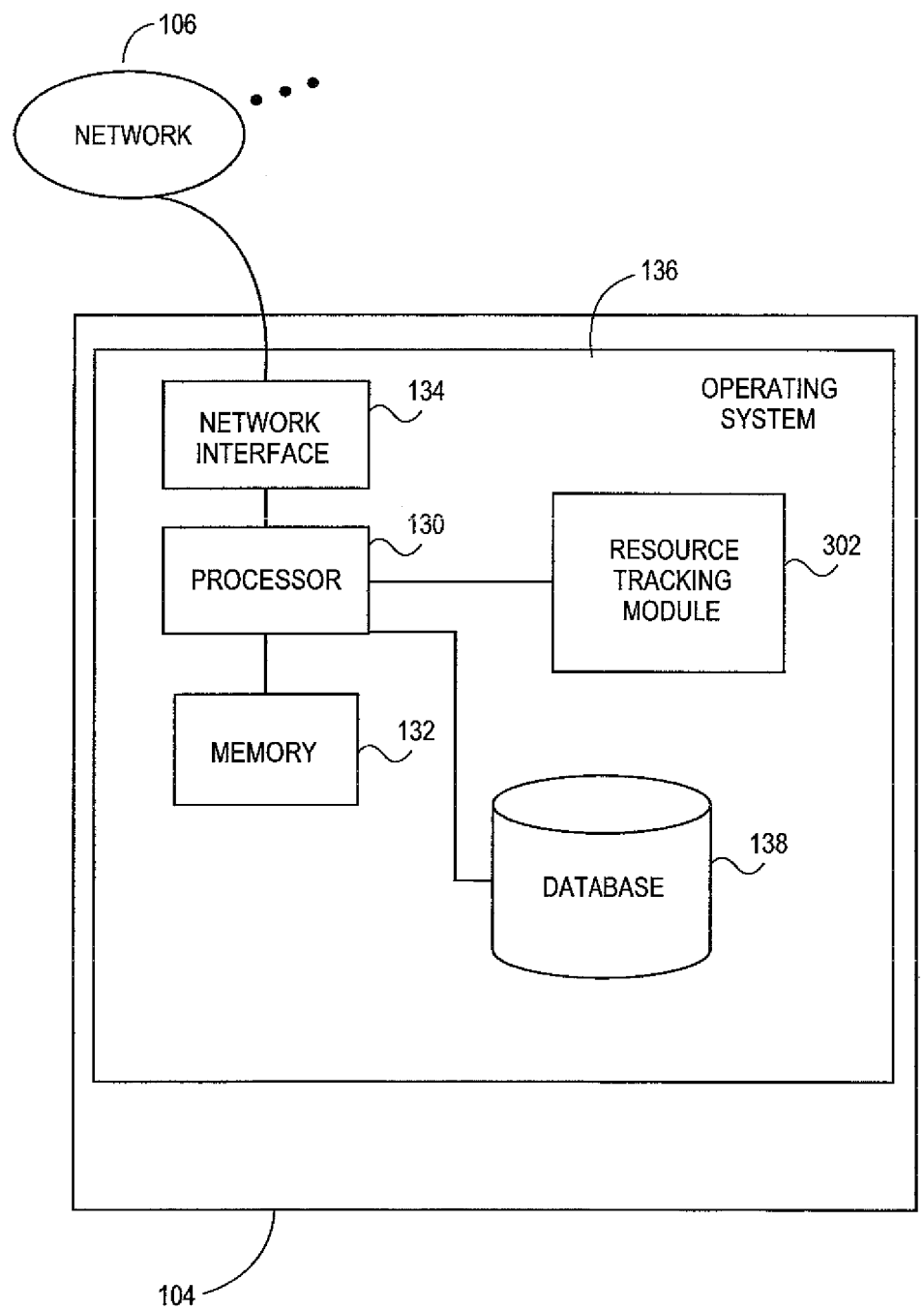
FIG. 4 illustrates an exemplary hardware configuration for a cloud management system, according to various embodiments.

FIG. 4 illustrates an exemplary diagram of hardware and other resources that can be incorporated in a cloud management system 104 configured to communicate with a set of instantiated virtual machines 116 (as shown in FIG. 2) via one or more networks 106, according to embodiments. In embodiments as shown, the cloud management system 104 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with one or more computer readable storage medium 138, such as hard drives, optical storage, databases, and the like. Processor 130 further communicates with network interface 134, such as an Ethernet or wireless data connection, which in turn communicates with one or more networks 106, such as the Internet or other public or private networks.

Processor 130 can also communicate with computer readable storage medium 138 and the resource managing module 302, to execute control logic, allow for managing multi-level SLAs as described herein, and control the operation of virtual machines and other resources in cloud 102. Other configurations of cloud management system 104, associated network connections, and other hardware and software resources are possible.

Figure 5:
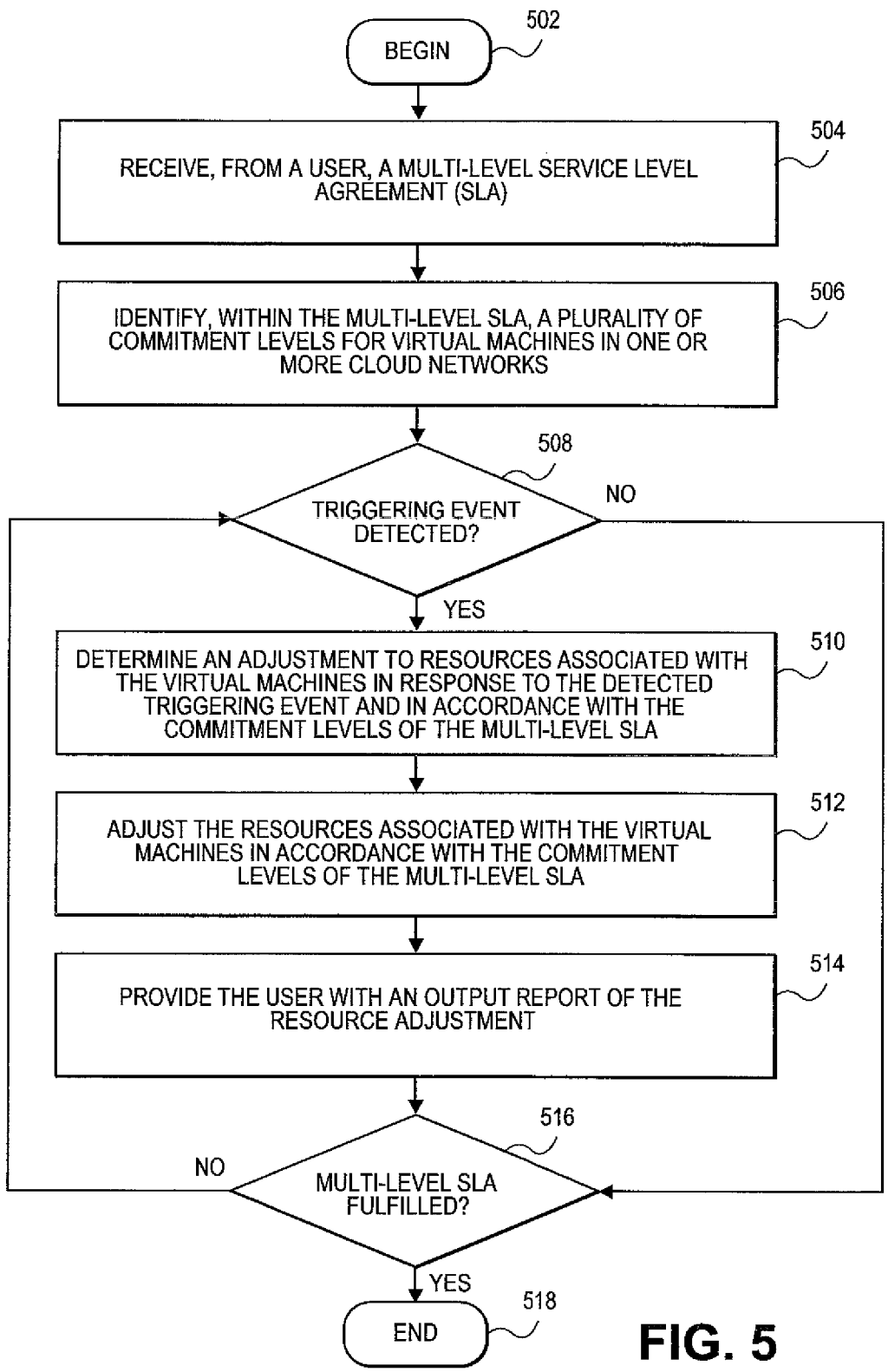
FIG. 5 illustrates a flowchart for managing multi-level service level agreements in cloud-based networks, according to various embodiments.

FIG. 5 illustrates a flowchart for overall multi-level SLA management processing in a cloud computing environment, according to various embodiments. In 502, processing can begin. In 504, a multi-level SLA can be received from a user. In embodiments, the multi-level SLA can be an agreement between a cloud provider and the user for the cloud provider to provide a set of virtual machines in one or more cloud networks for use by end users to operate software applications associated with the vendor via the set of virtual machines. In 506, a plurality of commitment levels for virtual machines in the one or more cloud networks can be identified. In embodiments, each of the plurality of commitment levels can describe a resource commitment for a specific event trigger, such as a time period changeover or a usage condition threshold being reached or exceeded. In 508, a triggering event can be detected. In embodiments, the triggering event can be detected when a specified time period ends or when a threshold use condition is reached or exceeded, and can trigger a change from one of the commitment levels to another of the commitment levels.

In 510, an adjustment to resources associated with the virtual machines can be determined in response to the detected triggering event and in accordance with the commitment levels of the multi-level SLA. In embodiments, the cloud management system 104 can examine the commitment levels of the multi-level SLA and determine an increase or decrease in associated virtual machine resources based on the detected triggering event. In 512, the resources associated with the virtual machines can be adjusted in accordance with the commitment levels of the multi-level SLA. In embodiments, the cloud management system 104 can terminate or instantiate one or more virtual machines in the same cloud network or in multiple cloud networks. Further, the cloud management system 104 can terminate one or more virtual machines in one cloud network and instantiate one or more virtual machines in another cloud network to effectively "roll over" resources available to end users from one cloud network to another. In 514, an output report of the resource adjustment can be provided to the user. In embodiments, the output report can be provided upon each resource adjustment, at varied or fixed intervals, or at other points during the term of the multi-level SLA. In 516, the terms of the multi-level SLA can be checked for fulfillment. If the multi-level SLA has not been fulfilled, processing can return to 508 for detection of a triggering event. If the multi-level SLA has been fulfilled, processing can proceed to end at 518.

The foregoing description is illustrative, and variations in configuration and implementation may occur to persons skilled in the art. For example, while embodiments have been described which operate using one resource managing module 302 and associated cloud management system 104, in embodiments, one or more of resource managing module 302 and associated cloud management system 104, and/or other servers, data stores, and/or other logic or resources can be used. For further example, while embodiments have been described in which cloud resources and subscription plans are modified or adjusted, in embodiments, the subscription plans, associated fees, and resources associated with the plans can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    identifying, within a multi-level service level agreement (SLA), a first commitment level indicating a first amount of instantiated virtual machines and a second commitment level indicating a second amount of instantiated virtual machines for virtual machines in a cloud network;
    detecting, by a processor, a triggering event that indicates a change should be made from the first commitment level to the second commitment level;
    generating a resource aggregation table comprising a plurality of sets of resources;
    identifying a set of resources from the plurality of sets of resources to supply an additional amount of instantiated virtual machines;
    adjusting resources associated with the virtual machines in the cloud network from the first commitment level to the second commitment level using the identified set of resources in response to detecting the triggering event, wherein adjusting the resources associated with the virtual machines in the cloud network comprises adjusting the amount of instantiated virtual machines across the cloud network and a second cloud network;
    determining whether a process on a virtual machine in the cloud network is infected by a computer virus; and
    terminating the process in response to determining whether the process on the virtual machine in the cloud network is infected by the computer virus.

2. The method of claim 1, wherein adjusting the resources associated with the virtual machines in the cloud network comprises adjusting an amount of instantiated virtual machines within the cloud network.

3. The method of claim 1, wherein adjusting the resources associated with the virtual machines in the cloud network comprises: terminating a first set of virtual machines within the cloud network; and instantiating a second set of virtual machines within the second cloud network.

4. The method of claim 1, wherein the triggering event corresponds to a time period schedule.

5. The method of claim 1, wherein the triggering event corresponds to an end user operation condition of the virtual machines in the cloud network.

6. The method of claim 1, wherein the multi-level SLA describes resource use related to at least one of server uptime, software application instantiation, engineering support, persistent storage, physical security, network performance, domain name services, cloud network storage, support response time, or server reboot.

7. The method of claim 1, further comprising providing an output report to a user.

8. The method of claim 1, wherein the virtual machines in the cloud network supports an application of an independent software vendor (ISV).

9. The method of claim 1, further comprising determining whether terms of the multi-level SLA have been fulfilled.

10. The method of claim 1, further comprising:
identifying, within the multi-level SLA, a third commitment level indicating a third amount of instantiated virtual machines for the virtual machines in the cloud network;
detecting a second triggering event that indicates a change should be made from the second commitment level to the third commitment level; and
adjusting resources associated with the virtual machines in the cloud network from the second commitment level to the third commitment level in response to detecting the second triggering event.

11. A system comprising:
an interface to a cloud network and in which virtual machines are hosted; and
a processor to communicate with the cloud network, the processor to:
identify, within the multi-level SLA, a first commitment level indicating a first amount of instantiated virtual machines and a second commitment level indicating a second amount of instantiated virtual machines for the virtual machines in the cloud network;
detect a triggering event that indicates a change should be made from the first commitment level to the second commitment level;
generate a resource aggregation table comprising a plurality of sets of resources;
identify a set of resources from the plurality of sets of resources to supply an additional amount of instantiated virtual machines;
adjust resources associated with the virtual machines in the cloud network from the first commitment level to the second commitment level using the identified set of resources in response to the detection of the triggering event, wherein adjust resources associated with the virtual machines in the cloud network comprises adjust an amount of instantiated virtual machines across the cloud network and a second cloud network;
determine whether a process on a virtual machine in the cloud network is infected by a computer virus; and
terminate the process in response to determine whether the process on the virtual machine in the cloud network is infected by the computer virus.

12. The system of claim 11, wherein adjust resources associated with the virtual machines in the cloud network comprises adjust an amount of instantiated virtual machines within the cloud network.

13. The system of claim 11, wherein adjust resources associated with the virtual machines in the cloud network comprises:
terminate a first set of virtual machines within the cloud network; and
instantiate a second set of virtual machines within the second cloud network.

14. The system of claim 11, wherein the triggering event corresponds to a time period schedule.

15. The system of claim 11, wherein the triggering event corresponds to an end user operation condition of the virtual machines in the cloud network.

16. The system of claim 11, wherein the multi-level SLA describes resource use related to one of server uptime, software application instantiation, engineering support, persistent storage, physical security, network performance, domain name services, cloud network storage, support response time, and server reboot.

17. The system of claim 11, wherein the virtual machines in the cloud network supports an application of an independent software vendor (ISV).

18. The system of claim 11, the processor further to determine whether terms of the multi-level SLA have been fulfilled.

19. The system of claim 11, the processor further to:
identify, within the multi-level SLA, a third commitment level indicating a third amount of instantiated virtual machines for the virtual machines in the cloud network;
detect a second triggering event that indicates a change should be made from the second commitment level to the third commitment level; and
adjust resources associated with the virtual machines in the cloud network from the second commitment level to the third commitment level in response to detecting the second triggering event.

20. A non-transitory computer readable storage medium comprising data that, when executed by a processor, causes the processor to execute operations comprising:
identifying, within a multi-level service level agreement (SLA), a first commitment level indicating a first amount of instantiated virtual machines and a second commitment level indicating a second amount of instantiated virtual machines for virtual machines in a cloud network;
detecting, by the processor, a triggering event that indicates a change should be made from the first commitment level to the second commitment level;
generating a resource aggregation table comprising a plurality of sets of resources;
identifying a set of resources from the plurality of sets of resources to supply an additional amount of instantiated virtual machines;
adjusting resources associated with the virtual machines in the cloud network from the first commitment level to the second commitment level using the identified set of resources in response to detecting the triggering event, wherein adjust resources associated with the virtual machines in the cloud network comprises adjust an amount of instantiated virtual machines across the cloud network and a second cloud network;
determining whether a process on a virtual machine in the cloud network is infected by a computer virus; and
terminating the process in response to determining whether the process on the virtual machine in the cloud network is infected by the computer virus.

* * * * *